United States Patent [19]

Karoly

[11] 4,187,250
[45] Feb. 5, 1980

[54] NOVEL TRIFUNCTIONAL AROMATIC AMINES

[75] Inventor: Gabriel Karoly, Springfield, N.J.

[73] Assignee: M&T Chemicals Inc., Woodbridge, N.J.

[21] Appl. No.: 912,229

[22] Filed: Jun. 5, 1978

[51] Int. Cl.$^2$ .................................................. C07C 87/50
[52] U.S. Cl. ..................................... 260/578; 528/60
[58] Field of Search .......................... 260/578; 528/60

[56] References Cited

U.S. PATENT DOCUMENTS

| | | | |
|---|---|---|---|
| 2,765,341 | 10/1956 | Wirth et al. | 528/60 X |
| 3,649,599 | 3/1972 | Swanson et al. | 528/60 X |
| 3,920,617 | 11/1975 | Hirosawa et al. | 260/578 X |
| 3,940,371 | 2/1976 | Case | 528/60 X |
| 4,029,626 | 6/1977 | Gillemot et al. | 528/60 X |

FOREIGN PATENT DOCUMENTS 2509404  9/1976  Fed. Rep. of Germany ........... 260/578

*Primary Examiner*—John Doll
*Attorney, Agent, or Firm*—Kenneth G. Wheeless; Robert Spector

[57] ABSTRACT

This invention pertains to novel aromatic, sulfur-containing triamines of the general formula

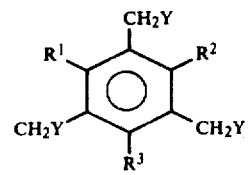

wherein $R^1$, $R^2$ and $R^3$ are each alkyl containing from 1 to 3 carbon atoms and Y is

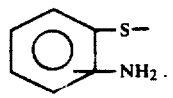

The present compounds are useful crosslinking agents that significantly decrease the curing time of elastomeric urethane/urea copolymers.

2 Claims, No Drawings

NOVEL TRIFUNCTIONAL AROMATIC AMINES

BACKGROUND OF THE INVENTION

This invention relates to a novel class of trifunctional aromatic amines. More particularly, this invention relates to a novel class of trifunctional aromatic amines that are useful as crosslinking agents for elastomeric urethane/urea copolymers.

SUMMARY OF THE INVENTION

The trifunctional amines of this invention exhibit the general formula

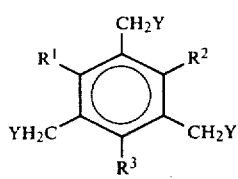

wherein $R^1$, $R^2$ and $R^3$ are individually selected from the group consisting of alkyl containing from 1 to 3 carbon atoms and Y is

The present trifunctional amines are prepared by reacting a tris(chloromethyl) trialkylbenzene with an alkali metal salt of an aminophenol.

It is well known that aromatic hydrocarbons and suitable derivatives thereof, such as phenols, can be chloromethylated using equimolar amounts of formaldehyde and hydrogen chloride. Preparation of the intermediates employed to obtain the present triamines requires three moles of formaldehyde and hydrogen chloride for each mole of mesitylene or other trialkylbenzene.

DETAILED DESCRIPTION OF THE INVENTION

The compounds of this invention are prepared by chloromethylation of a trialkylbenzene such as mesitylene. The resultant product, a tris(chloromethyl)-1,3,5-trialkylbenzene is then reacted with an alkali metal salt of one of the three isomeric aminothiophenols. If o-aminothiophenol is employed, the alkali metal salt is conveniently prepared by reacting benzothiazole with an aqueous solution containing a stoichiometric amount of an alkali metal hydroxide such as sodium hydroxide.

Preferably the tris(chloromethyl)benzene derivative is gradually added to a heated reaction mixture containing the aforementioned alkali metal thiophenoxide.

Following completion of the addition the heating should be continued for a sufficient time, to ensure a substantially complete reaction. An effective amount of an ammonium or a phosphonium compound such as tetrabutyl phosphonium chloride may be present during the reaction in order to accelerate the rate of the reaction and improve product yield. The catalyst is usually employed at a concentration from 0.1 to 1.0, based on the combined weight of the two reagents.

The reaction mixture employed to prepare the present compounds may contain a liquid aromatic hydrocarbon, such as toluene as a diluent. This diluent is preferably added together with the tris(chloromethyl)benzene derivative and provides a solvent in which both of the reagents and the desired product are soluble. The reaction is preferably conducted at the boiling point of the diluent.

The aqueous phase that originally contained the aminothiophenoxide is discarded following completion of the reaction. The desired product is often insoluble in the hydrocarbon diluent and ambient temperature, and is readily isolated by cooling the reaction mixture following removal of the aqueous phase.

The following examples disclose preferred embodiments of the present compositions and should not be interpreted as limiting the scope of the accompanying claims. All parts and percentages are by weight unless otherwise specified.

EXAMPLE 1

Preparation of 2,4,6-tris(o-aminophenylthiomethyl)mesitylene

A 2-liter glass reaction vessel equipped with a Teflon ® stirrer, reflux condenser, addition funnel, 2-thermometers and an electrical heater was charged with 243 g water and 104.2 g sodium hydroxide pellets. After boiling under a nitrogen atmosphere for 5 minutes, 167.8 g benzothiazole was gradually added to the contents of the reactor over 50 minutes. The resultant mixture was then heated at the boiling point for 2 hours. A solution of 0.5 g tetrabutyl phosphonium chloride (50% in toluene) and 50 g toluene was then added, which cooled the reaction mixture to 90° C. A solution of 100 g 2,4,6-tris(chloromethyl)mesitylene in 300 g of warm toluene was added over a 15 minute period and the resultant mixture was heated at the boiling point for 2 hours. The aqueous phase of the reaction mixture was then removed and the organic phase washed with 100 g hot water. The residual water was removed by azeotropic distillation. After being filtered the toluene solution gradually cooled to room temperature, during which time a slightly off-white solid crystallized. The solid was filtered off, washed sequentially with cold toluene and heptane and then dried under reduced pressure at 90° C. The product weighed 164.7 g melted from 161° to 166° C. and exhibited an amine equivalent of 181. The theoretical amine equivalent for the expected product, 1,3,5-tris(o-aminophenylthiomethyl)mesitylene is 178.

EXAMPLE 2

This example demonstrates the utility of the present compounds as crosslinking agents for elastomeric urethane/urea copolymers. Two elastomeric urethane/urea copolymers were prepared using a tolylene diisocyanate-terminated polytetramethylene ether glycol prepolymer that exhibited a molecular weight of 1000. The prepolymer was cured at 84° C. using 1,2-bis(2-aminophenylthio)ethane in an amount equivalent to 85% of stoichiometry, based on the number of isocyanate groups present. One of the two samples also contained 10 mole %, based on diamine, of 2,4,6-tris(o-aminophenylthiomethyl)mesitylene. Prior to being combined with the diamine the prepolymer was degassed by heating it to 85° C. while maintaining the prepolymer under reduced pressure for 10 minutes. The diamine together with the catalyst was heated to 85° C., at which time it was added to the degassed prepolymer.

The time at which these reagents were combined was used as the zero reference point. The resultant mixture was stirred for 40 seconds and then degassed for 1.3 minutes at 85° C. under reduced pressure, after which it was poured into a mold containing six L-shaped cavities wherein each "leg" of the cavity was 2 inches (5 cm) long, 1 inch (2.5 cm) wide and 0.05 inch (1.8 cm) deep. The mold was then placed on the lower platen of a hydraulic press that was heated to 85° C. The surface of the liquid was periodically probed with a metal spatula until it had solidified to the extent that the spatula would not penetrate the surface using moderate pressure. A cover was then placed on the mold and it was subjected to a pressure of 35,000 pounds (1590 kg) using a 5 inch (12.7 cm) diameter ram. The small amount of polymer which overflowed when the press was closed was probed periodically using a metal spatula. When the polymer was no longer "tacky", i.e. it did not stick to the spatula, the first of the six samples in the mold was removed and tested for fracture resistance by grasping each end of the sample and applying force in a direction perpendicular to each leg of the "L" shaped sample in an attempt to initiate a fracture at the interior angle formed by the junction of the two legs. If a fracture was initiated the mold containing the remaining five samples was closed and replaced in the press. Samples were removed at various intervals and tested for fracture resistance as described in the preceding sentence. The time interval between combining the reagents and removal of the first sample which could not be fractured using the aforementioned test is referred to as the demold time for that particular prepolymeramine mixture.

The demold times for the two samples described in this example are recorded in the following table.

| Crosslinking Agent Present | Demold Time (Minutes) |
|---|---|
| no | 47 |
| yes | 23 |

What is claimed is:
1. A trifunctional amine of the general formula

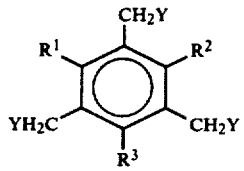

wherein $R^1$, $R^2$ and $R^3$ are individually selected from the group consisting of alkyl containing from 1 to 3 carbon atoms and Y is

2. A trifunctional amine according to claim 1 wherein $R^1$, $R^2$ and $R^3$ are each methyl.